(12) United States Patent
Van Heeswijk et al.

(10) Patent No.: US 6,702,095 B2
(45) Date of Patent: Mar. 9, 2004

(54) METHOD AND DEVICE FOR CONVEYING OBJECTS

(75) Inventors: Henricus Wilhelmus Marinus Van Heeswijk, Schijndel (NL); Petrus Theodorus Cornelis Vervoort, Oss (NL); Marinus Adrianus Maria Potters, Eindhoven (NL); Johannes Antonius Henricus Maria Van Keulen, Heeze (NL); Ivo Johannes Van Der Meulen, 's-Hertogenbosch (NL); Marcus Wilhelmus Maria Van Hoorn, Apeldoorn (NL); Johannes Martinus Maria Van Boxtel, Uden (NL)

(73) Assignee: Vanderlande Industries Nederland B.V., Veghel (NL)

( * ) Notice: Subject to any disclaimer, the term of this patent is extended or adjusted under 35 U.S.C. 154(b) by 79 days.

(21) Appl. No.: 09/988,562

(22) Filed: Nov. 20, 2001

(65) Prior Publication Data

US 2002/0066638 A1 Jun. 6, 2002

(30) Foreign Application Priority Data

Nov. 21, 2000 (NL) .............................................. 1016667

(51) Int. Cl.$^7$ .............................................. B65G 47/46
(52) U.S. Cl. ................................. 198/369.2; 198/460.1
(58) Field of Search ................................. 198/357, 358, 198/369.2, 460.1, 460.3

(56) References Cited

U.S. PATENT DOCUMENTS

| | | | | |
|---|---|---|---|---|
| 1,781,424 A | * | 11/1930 | Anderson ................... | 198/354 |
| 3,747,781 A | * | 7/1973 | Daigle et al. ............ | 198/463.3 |
| 4,227,607 A | * | 10/1980 | Malavenda .............. | 198/460.1 |
| 4,541,824 A | | 9/1985 | Muller | |
| 5,038,911 A | | 8/1991 | Doane | |
| 5,909,796 A | * | 6/1999 | Soldavini ................. | 198/369.2 |
| 6,023,034 A | * | 2/2000 | Nakajima et al. .......... | 209/584 |
| 6,129,199 A | * | 10/2000 | Gretener et al. ............ | 198/357 |
| 6,513,641 B1 | * | 2/2003 | Affaticati et al. ........... | 198/357 |

FOREIGN PATENT DOCUMENTS

| | | |
|---|---|---|
| WO | 98/09894 | 3/1998 |
| WO | 99/41169 | 8/1999 |

* cited by examiner

Primary Examiner—Christopher P. Ellis
Assistant Examiner—Mark A. Deuble
(74) Attorney, Agent, or Firm—Oblon, Spivak, McClelland, Maier & Neustadt, P.C.

(57) ABSTRACT

A method and device for conveying packages supplied from at least one supply unit, via a transfer unit, to a switch unit formed by a conveyor, pivotable about a horizontal axis and in which the packages are carried to a first discharge conveyor in a first position of the switch unit and to a second discharge conveyor arranged above the first discharge conveyor in a second position of the switch unit. The method and device detect the size and the identity of the packages, and control the transport of the packages by the supply unit and/or the transfer unit influenced by the detecting of the size of the packages. The spacing between packages delivered to the switch unit that are carried to the same discharge conveyor is smaller than the spacing between packages delivered to the switch unit that are carried to a second discharge conveyor.

7 Claims, 2 Drawing Sheets

METHOD AND DEVICE FOR CONVEYING OBJECTS

Figure 1:
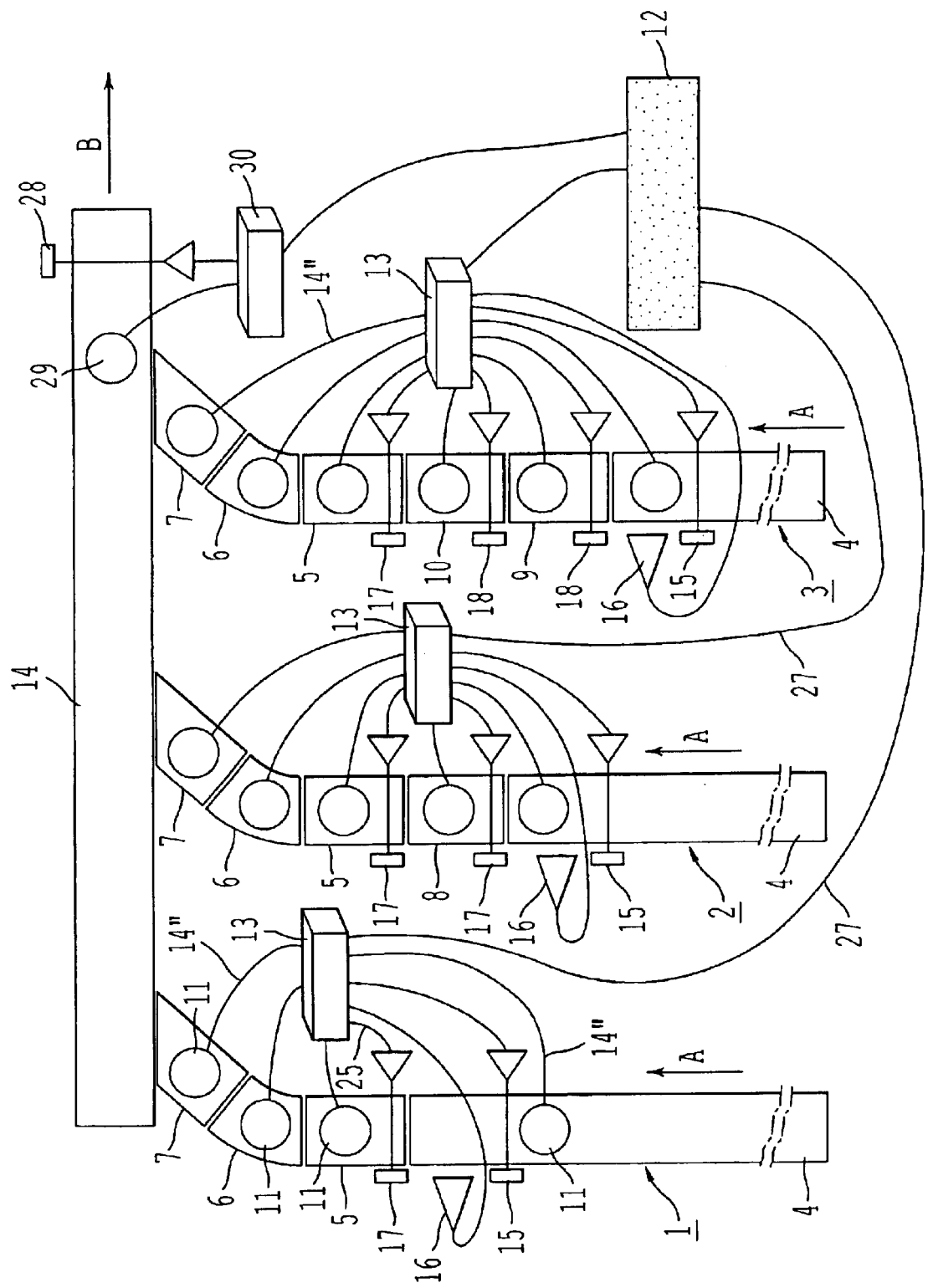

The invention relates to a method for conveying objects, which objects are supplied from at least one supply unit, via a transfer unit, to a switch unit by means of which the objects are carried to a first discharge unit in a first position of the switch unit and to a second discharge unit in a second position of the switch unit.

Such a method as well as a device for carrying out such a method can be derived from the publication WO 98/09894.

The switch unit of said known device is made up of a conveyor belt which can be pivoted up and down about a horizontal pivot pin. A certain amount of time is needed for pivoting the switch unit from one position to the other, during which time no objects can be delivered to a discharge unit. There are mechanical limits to the speed at which the adjustment of said switch unit can take place. For an effective operation of this known device it is necessary, therefore, to maintain a certain spacing between the successive objects, which imposes limits on the number of objects that can be handled per unit time by means of this known device.

According to the invention, detection means are provided for detecting the size of the objects being supplied by means of the supply unit and for detecting the identity of the objects being supplied in connection with the desired convey of the objects either to the first discharge unit and/or to the second discharge unit, and control means are provided for controlling the transport of the objects by means of the supply unit and/or the transfer unit, which control means are influenced by the detection means, all this in such a manner that the spacing between objects lying one behind another on the transfer unit and being delivered to the switch unit in succession that are to be carried to the same discharge unit is smaller than the spacing between objects lying one behind another on the transfer unit and being delivered to the switch unit in succession that are to be carried to different discharge units.

Use is thereby made of the fact that if two successive objects are to be carried to one and the same discharge unit, no time is required for reversing the switch unit, so that these objects to be carried to the same discharge unit can be placed closer together, which means a significant increase of the number of objects that can be moved per unit time.

An efficient device far conveying objects, comprising at least one supply unit which joins a transfer unit, one end of which is disposed near a switch unit that is adjustable between a first position for carrying an object to a first discharge unit and a second position for carrying an object to a second discharge unit, which device is in particular suitable for carrying out the method according to the invention, is obtained in that detection means are disposed near said supply unit, by means of which the size of the objects and the identity of the objects being supplied can be established in connection with the desired convey of the objects either to the first discharge unit or to the second discharge unit, whilst the supply unit includes control means that can be influenced via the detection means, which control means make it possible to influence the velocity at which an object is carried in the direction of the transfer unit by the supply unit.

The invention will now be explained in more detail by means of possible embodiments of a device according to the invention which are schematically illustrated in the accompanying figures.

FIG. 1 schematically shows a few supply units that connect to a transfer unit.

Figure 2:
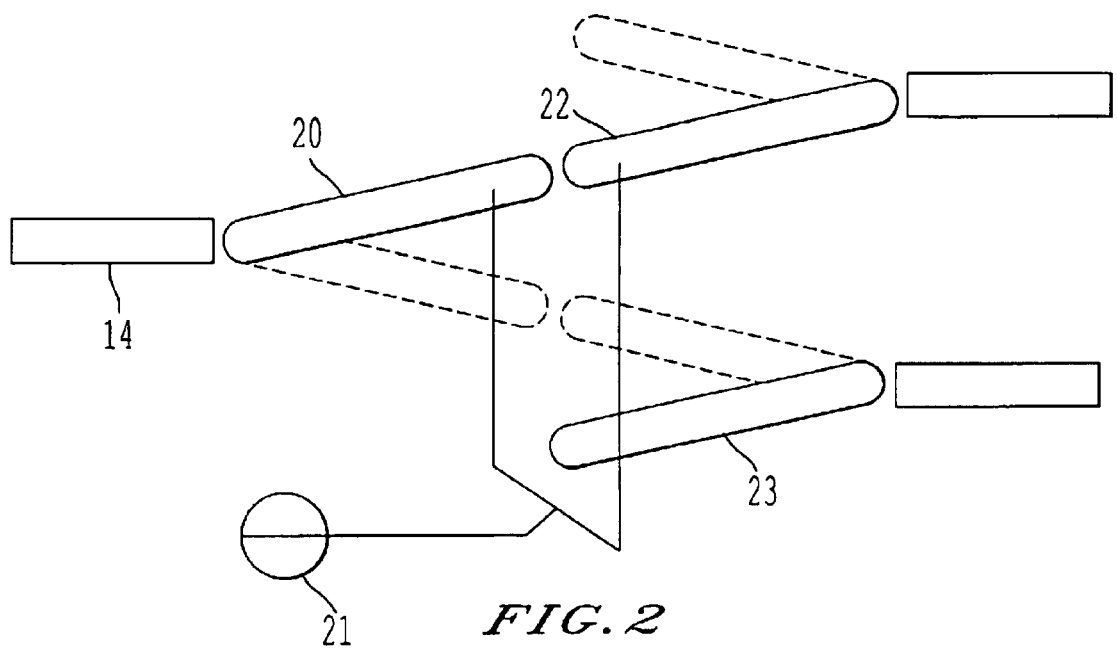

FIG. 2 schematically shows the construction of a switch unit.

Figure 3:
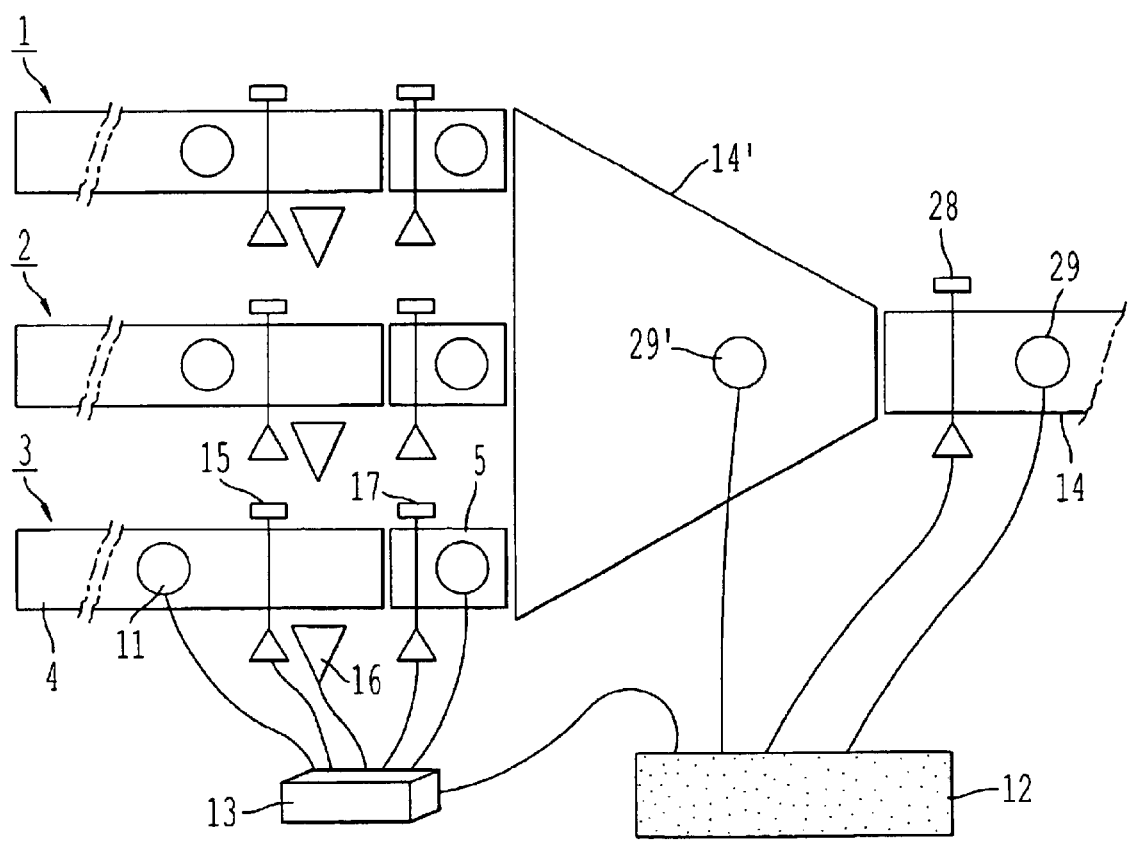

FIG. 3 schematically shows another possible embodiment of three supply units connected to a transfer unit.

As is schematically shown in FIG. 1, the illustrated embodiment of the device according to the invention comprises three supply unit 1–3. In the illustrated embodiment, the supply unit 1 is built up of four conveyors 4–7, preferably in the form of endless conveyor belts, although also roller conveyors, for example, or the like will be conceivable.

The two supply units 2 and 3 comprise identical conveyors 4–7, the supply unit 2, however, comprises a further conveyor 8, preferably in the form of an endless conveyor belt, which is disposed between the conveyor 2 and the conveyor 5, whilst the supply unit 3 comprises two further conveyors 9 and 10, preferably in the form of endless conveyor belts, which are disposed between the conveyor 4 and the conveyor 5.

Each of the aforesaid conveyors can be driven by a motor 11 (schematically indicated for conveyors 4–7). The rotational speeds of the various motors 11 of the supplying units 1–3 can be controlled via control means comprising a so-called "flow controller" in the form of a computer 12, as well as a junction box 13 for each of the supply units 13. Connected to a junction box 13 associated with a supply unit 1–3, via control lines 14, are the motors of, respectively, the associated conveyors 4–7, 4–8 and 4–7 and 9 and 10.

The objects to be handled are supplied to a common transfer unit 14 in the direction indicated by arrow A by means of supply units 13, which transfer unit is preferably formed by a conveyor in the form of an endless belt, by means of which the objects are supplied in the direction indicated by arrow B to a switch unit which will be described in more detail hereinafter.

The number of further conveyors that are added to a supply unit downstream of the conveyor 5 depends on the distance that is to be covered before the transfer unit 14 is reached.

The device according to the invention furthermore comprises detection means, which include a photocell 15 disposed at the discharge end of the conveyor 4, amongst other things, as well as a scanner 16, by means of which a bar code that is present on an object can be read, for example, for establishing the identity of the object in question. Furthermore, a photocell 17 is disposed at the upstream end of the conveyor 5. In addition to that, a photocell 17 is disposed at the upstream end of the conveyor 8 and photocells 18 are disposed at the upstream ends of the conveyors 9 and 10.

As is schematically shown in FIG. 2, the objects can be supplied by means of the transfer unit 14 to a switch unit 20 in the form of a conveyor in the present embodiment, preferably in the form of an endless conveyor belt 20, which can be adjusted between two positions. As is indicated in FIG. 2, said conveyor belt can be pivoted between a first, upwardly sloping position and a second, downwardly sloping position by means of a drive unit 21 in a manner which is known per se. In the upwardly sloping position, objects can be transferred by means of the conveyor belt 20 to a conveyor belt 22, which is in line with the conveyor belt 20 in this position, which conveyor belt 22 forms a discharge unit. In the downwardly sloping position of the conveyor belt 20 (illustrated in dotted lines), objects can be delivered by means of the conveyor belt 20 to a further conveyor belt 23 forming a discharge unit, which is in line with the conveyor belt 20 in that position. The conveyor belts 22 and 23 are interconnected in a manner which is known per se, and said conveyor belts 22 and 23 can be pivoted simultaneously with the conveyor belt 20, albeit in the opposite direction, in a well-known manner by means of the drive unit 21. Since the two conveyor belts or conveyors 22 and 23 remain interconnected, said conveyor belts continue to extend substantially parallel to each other. Thus, objects are prevented from getting wedged between the conveyors 22 and 23 during operation, as may be the case when the conveyor 23 is fixedly disposed in the position that is illustrated in dotted lines for conveyor 23 and only the conveyor 22 can pivot up and down. This, too, contributes to a quick feed-through of objects.

The operation of the above-described device is as follows.

Objects having different dimensions and different destinations can be supplied in the direction indicated by arrow A by means of the conveyors 4 of the various supply units. The objects will generally be provided with bar codes or the like, which indicate the identity and/or the destination of the objects.

The dimensions of the objects being supplied can be determined by means of the photocells 15, which are connected to the respective junction boxes 13 via lines 24.

Furthermore, the bar codes or the like can be read by means of the scanners 16 for establishing the identity and/or the destination of the objects. A system for recording and processing such data can be derived from U.S. Pat. Nos. 5,038,911 and 5,860,504.

On the basis of the information thus obtained, the object can "reserve" a space on the transfer unit 14, in such a manner that an object will not come into conflict with other objects.

The starting position for an object to be supplied to the transfer unit is determined by means of a photocell 16, which is connected to a junction box 13 via a line 25.

The data recorded in the various junction boxes are supplied to the computer 12 via lines 27, by means of which computer the device is controlled in such a manner that two objects being supplied to the transfer unit 14, which objects will be positioned directly behind each other at the discharge end of the transfer unit 14 located near the switch unit 20, will be spaced a comparatively short distance apart if they are to be carried to the same discharge unit, whilst the spacing between two successive objects near the discharge end of the transfer unit 14 will be larger if said objects are to be carried to different discharge units.

The transport of the objects by means of the transfer unit is also controlled by the computer 12, since the movement of the objects on the transfer unit is detected by a photocell 28 disposed near the discharge end of the transfer unit 14, which photocell is connected to the computer 12 via a junction box 30, as is the driving motor 29 of the transfer unit 14.

In the embodiment that is shown in FIG. 1, the distance over which an object being supplied by the supply unit 1 is to be moved to the switch unit 20 by means of the transfer unit 14 is larger than the distance over which an object being supplied by the supply unit 2 is to be moved to the switch unit 20 by means of the transfer unit 14, whilst the latter distance in turn is larger than the distance over which an object being supplied by the supply unit 3 is to be moved in the direction of the switch unit 20 by means of the transfer unit 14, and consequently the supply unit 2 is provided with an additional conveyor 8 and the supply unit 3 is provided with two additional conveyors 9 and 10, on which objects supplied by means of the conveyors 4 of the supply units in question can be put "on hold", be slowed down or be accelerated by suitably controlling the driving motors 11 of the various conveyors in order to place an object at the intended place at the correct time on the transfer unit 14 under the control of the computer 12 in this manner, whilst maintaining the intended distances between the objects, as explained above.

As already explained before, successive objects that are to be delivered to the same discharge unit 22 or 23 may be spaced a comparatively short distance apart, since the switch unit 20 does not need to be adjusted during the transport of said successive objects to a discharge unit 22 or 23. In general, a comparatively small spacing between said successive objects is desirable, since the objects are generally slightly tilted at the transition from the transfer unit 14 to the switch unit 20.

If an object is to be moved to the discharge unit 23 after she preceding object has been moved to the discharge unit 22, for example, the switch 20 needs to be adjusted. Since this adjustment of the switch unit takes some time, the distance that is maintained between a first object to be delivered to a first discharge unit 22 or 23 and a next, second object to be delivered to the discharge unit 23 or 22 is according to the invention larger than the distance that is maintained between successive objects that are to be delivered to the same discharge unit, so that sufficient time will be available for adjusting the switch 20 before said second object arrives at the switch 20.

Pivoting of the two conveyors 22 and 23 can take place directly after an object has been discharged onto the lower discharge unit 23, if necessary, since there is no danger of the object getting wedged between the conveyors 22 and 23, as already explained above. This, too, helps to achieve a large through-put capacity of the device.

FIG. 3 schematically shows part of a further possible embodiment of a device according to the invention. Parts that correspond to parts that have been described with reference to FIG. 1 are provided with the same numerals as in FIG. 1. In the figure, only the junction box 13 of the supply unit 3 is shown for the sake of simplicity.

In this embodiment, the three supply units 1–3 join the same end of an auxiliary transfer unit 14'; the intermediate conveyors 8, 9 and 10 of the embodiment according to FIG. 1 are no longer used in this embodiment. The auxiliary supply unit 14' is so designed that the objects being supplied to the auxiliary supply unit 14' in different points located one beside another will be placed in a desired order behind each other, for example as described in Dutch patent no. 181,648. Apart from that, the operation of this embodiment as shown in FIG. 3 is the same as that of the embodiment described above with reference to FIGS. 1 and 2.

What is claimed is:

1. A method for conveying packages, which packages are supplied from at least one supply unit, via a transfer unit, to a switch unit formed by a conveyor, which is pivotable about a horizontal axis and by which the packages are carried to a first discharge unit conveyor in a first position of the switch unit and to a second discharge conveyor arranged above said first discharge conveyor in a second position of the switch unit, comprising:

detecting the size of the packages being supplied by the supply unit and detecting the identity of the packages being supplied in connection with the desired convey of the packages either to the first discharge unit conveyor and/or to the second discharge conveyor, and controlling the transport of the packages by the supply unit and/or the transfer unit, which control is influenced by the detecting such that the spacing between packages lying one behind another on the transfer unit and being delivered to the switch unit in succession that are to be carried to the same discharge conveyor is smaller than the spacing between packages lying one behind another on the transfer from which a foremost package has to be carried to said same discharge conveyor via said switch unit and a succeeding package that has to be carried to another discharge conveyor via said switch unit.

2. A The method according to claim 1, wherein packages are supplied to the transfer unit by plural supply units, wherein the dimensions of the packages being supplied as well as the desired movement of the packages are detected for each of said supply units individually so as to ensure that the packages being supplied to the transfer unit by the various units are correctly positioned one behind the other.

3. A The method according to claim 1 or 2, wherein the supply of packages to the transfer unit is controlled by varying the carrying velocity of the supply unit.

4. A device for conveying packages, comprising:

at least one supply unit which joins a transfer unit, one end of which is disposed near a switch unit formed by a conveyor, which is pivotable about a horizontal axis between a first position for carrying a package to a first discharge conveyor and a second position for carrying a package to a second discharge conveyor disposed above said first conveyor; and detection means disposed near said supply unit, by which the size of the packages and the identity of the packages being supplied can be established in connection with the desired convey of the packages either to the first discharge conveyor or to the second discharge conveyor, wherein the supply unit includes control means configured to be influenced via the detection means, which control means are configured to influence the velocity at which a package is carried in the direction of the transfer unit by the supply unit such that the spacing between packages lying one behind another on the transfer unit and being delivered to the switch unit in succession that are to be carried to the same discharge conveyor is smaller that the spacing between packages lying one behind another on the transfer unit from which a foremost package has to be carried to said same discharge conveyor via said switch unit and a succeeding package that has to be carried to another discharge conveyor via said switch unit.

5. A device according to claim 4, wherein said device comprises plural supply units, which are each provided with associated detection means which are connected to a common computer for the supply units, by which the operation of the supply units for supplying packages to the transfer unit can be controlled.

6. The device according to claim 4 or 5, wherein means for detecting packages as well as means for controlling the velocity at which packages are moved by the transfer unit disposed near the discharge end of the transfer unit.

7. The device according to claim 4, wherein said discharge conveyors disposed one above the other can be pivoted jointly with the conveyor forming the switch unit, wherein said discharge conveyors are interconnected such that said discharge conveyors extend at least substantially parallel to each other in every position.

* * * * *